United States Patent Office 3,798,241
Patented Mar. 19, 1974

---

3,798,241
BIDENTATE COORDINATES, THEIR MANUFACTURE AND APPLICATION
Henri Kagan, Orsay, and Tuan Phat Dang, Antony, France, assignors to Institut Francais du Petrole, des Carburants et Lubrifiants
No Drawing. Filed Dec. 7, 1971, Ser. No. 205,744
Claims priority, application France, Dec. 10, 1970, 7044632
Int. Cl. C07d 13/04
U.S. Cl. 260—340.9
4 Claims

ABSTRACT OF THE DISCLOSURE

Bidentate coordinates of the formula $R_2X—R'—YR_2$, in which X and Y are phosphorus, arsenic, antimony or nitrogen, R' is a hydrocarbon group containing an asymmetric carbon atom and the R groups are hydrocarbon radicals, may be associated with rhodium complexes to yield hydrogenation catalysts useful in asymmetric synthesis. The synthesis of optically active aminoacids or amines is concerned.

---

It is known that asymmetric synthesis may be carried out with the use, as catalysts, of transition metal complexes whose coordinates are optically active.

Thus unsaturated compounds may be hydrogenated to saturated compounds having an optical activity, by means of rhodium complexes of the formula $L_3RhCl$ in which L is a coordinate whose donor atom is optically active. For example, when hydrogenating α-phenyl acrylic acid to α-phenyl propionic acid in contact with RhCl $(PR_1R_2R_3)_3$, the optical yield may range from 1 to 30% according to the particular phosphine used. The best optical yields are obtained when the asymmetry is located on the phosphorus atom. Conversely, when located on the hydrocarbon radical, it gives very bad results.

It has now been found that the optical yield of the asymmetric synthesis was considerably improved by using bidentate coordinates having asymmetric carbon atoms in the hydrocarbon chain linking the two donor atoms.

The coordinates to be used in this invention conform to the following formula:

$$R_2X—R'—YR_2$$

in which X and Y which may differ from each other are phosphorus, arsenic, antimony or nitrogen. Phosphorus is preferred in view of the improved results obtained therewith. R' is a bivalent hydrocarbon group having one or more asymmetric carbon atoms and optionally heteroatoms such as oxygen or nitrogen, the asymmetric carbon atoms being optionally linked in a ring. The radicals R which may differ from each other are optionally substituted aliphatic, cycloaliphatic or aromatic hydrocarbon groups.

For example R' may be alkylene, cycloalkylene or arylalkylene and R may be alkyl, cycloalkyl, aryl or amino.

R' preferably has 2, 3 or 4 carbon atoms in the direct chain linking X and Y, these carbon atoms being optionally substituted so that the radical R' may have, if desired, a total number of carbon atoms higher than these figures.

The following are examples of the coordinates of this invention:

(a) With two carbon atoms between X and Y:

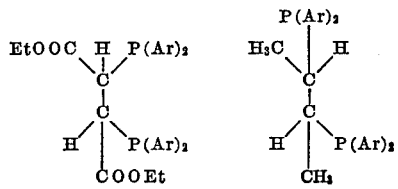

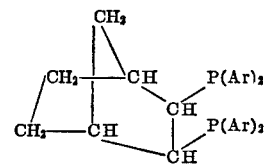

Ar=phenyl, tolyl, xylyl.

(b) With three carbon atoms between X and Y:

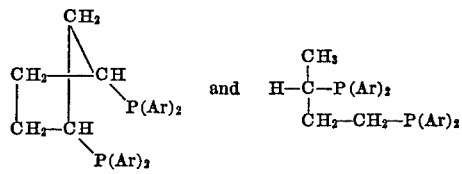

(c) With four carbon atoms between X and Y:

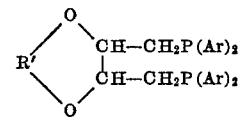

with R'=alkylidene, benzylidene or cycloalkylidene, for example methylene, benzylidene or cyclopentylidene.

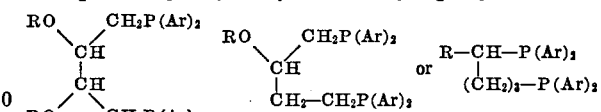

with R=alkyl (example ethyl, isobutyl); cycloalkyl (example cyclopentyl, cyclohexyl); acyl (example acetyl, benzoyl); carbamoyl (example N-phenyl carbamoyl).

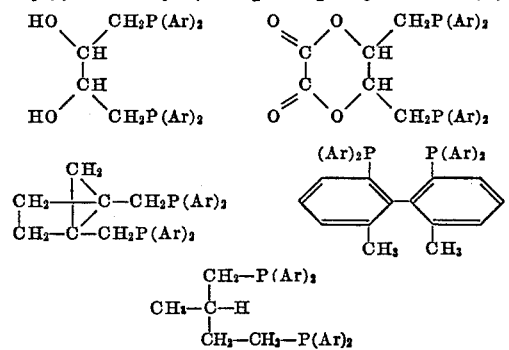

In these formulae Ar=phenyl, tolyl, xylyl. One object of this invention is the use of catalytic compositions containing these new bidentate coordinates in asymmetric synthesis.

These catalytic compositions may be represented by the general formula:

$$R_2X\diagdown \atop R_2Y\diagup (A)_pM—R'$$

in which X and Y, which may differ from each other, are phosphorus, arsenic, antimony or nitrogen, and are preferably phosphorus.

R' is a hydrocarbon radical which contains one or more asymmetric carbon atoms and, if desired, heteroatoms such as oxygen or nitrogen. The carbon atoms thereof may be linked in a ring.

The R radicals are aliphatic, cycloaliphatic or aromatic hydrocarbon radicals, M is a transition metal of the VIIIth group of the periodic classification of the elements which is linked to anions A in a number p corresponding to the metal oxidation degree.

The synthesis of the bidentate coordinates of this invention may be carried out according to conventional methods. As a rule, it is preferred to use, as starting material, an optically active compound so as to avoid any splitting and to have the essential elements of the desired structure.

Convenient materials are, for example, optically active tartaric acid and malic acid and their derivatives such as esters and amides; other starting materials consist of optically active aminoacids and their derivatives.

The following Examples I to IV illustrate the synthesis of the asymmetric phosphines of this invention:

EXAMPLE 1

The following diphosphine: ⑤

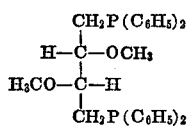

is manufactured from (L)(+)-ethyl tartrate according to the following scheme:

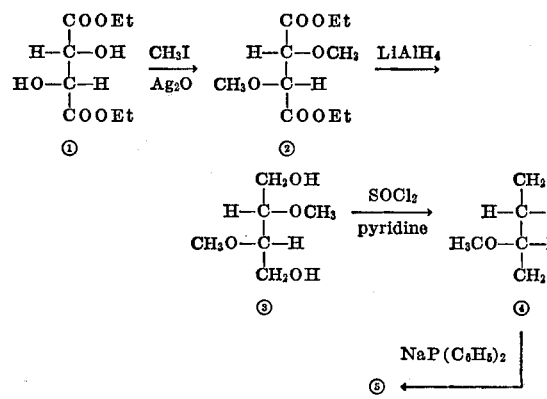

The methyl diether ② is manufactured by reacting methyl iodide and silver oxide with di-ethyl tartrate; the resulting diether boils at 133–135° C. under 14 mm. Hg.

This diether is reduced to the glycol ③ in the presence of lithium aluminum hydride in ethyl ether according to the method of Feit (J. med. Chem. (1964) 7, 14). $[\alpha]_D^{26} = +6.33°$ (EtOH, c.=6.72 g./100 ccm.). By reacting ③ with SOCl₂ in pyridine, compound ④ is obtained: B.P.: 92° 5/15 mm. Hg; $[\alpha]_D^{26} = 40.6°$ (C₆H₆, c.=7.7 g./100 ccm.).

Finally the dichloro derivative (4) is added to a solution of (C₆H₅)₂ PNa. When the phosphorus derivative disappears, the color turns from yellow to white. The reaction mixture is filtrated and concentrated to dryness. The diphosphine ⑤ may be extracted with hexane from the residue: it is obtained in the raw state with a yield of 60%. The pure product may be obtained by conventional purification methods.

The above synthesis of the Compound ⑤ may be varied: any variant is intended to be within the scope of this invention.

EXAMPLE 2

The following diphosphine is a part of this invention:

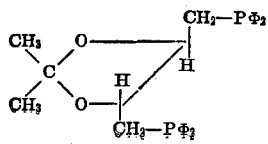

Φ is here for phenyl. It may be manufactured from (L)(+)-ethyl tartrate ① according to the scheme:

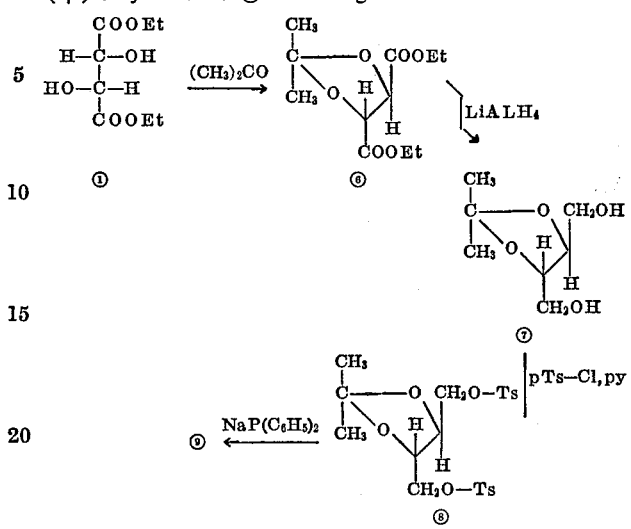

Ts means tosylate and py is pyridine.

The glycol ⑦ may be manufactured by reacting acetone with said ethyl tartrate and then reducing with lithium aluminium hydride. Said glycol is then transformed to the tosylate ⑧ M.P.: 92° C. $[\alpha]_D^{22} = 11.9°$ (CHCl₃, c.=5.47 g./100 ccm.).

The diphosphine ⑨ is obtained by pouring a 0.22 M solution of ⑧ into a 0.45 M solution of (C₆H₅)₂PNa in a mixture of dioxane and THF. After 2 hours of reaction, the resulting mixture is diluted with benzene, filtrated and concentrated to dryness. The resulting diphosphine may be recrystallized in absolute alcohol. The yield of pure crystallized product (M.P.: 87° C.) is 30%. $[\alpha]_D^{22} = -12.34°$.

EXAMPLE 3

Example 2 is repeated up to the production of tosylate of the Formula ⑧. The latter is reacted with a phosphorus derivative of the formula:

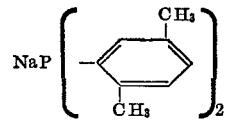

and there is obtained a diphosphine of the Formula ⑨ in which Φ is a para-xylyl radical. This diphosphine may be recrystallized from absolute alcohol. M.P. 121–122° C. $[\alpha]_D^{25} = 18.9°$ (c.=1.6, benzene).

EXAMPLE IV

Example II is repeated with D(−) ethyl tartrate as starting material.

NaP(C H₅)₂ is reacted with the di-tosylate ⑧ similar to that of Example 2. This results in a crystallized diphosphine ⑨ with a yield of 45%. $[\alpha]_D^{22} = +12.32°$.

The manufacture of the catalytic compositions using the bidentate coordinates of this invention may be carried out according to the known methods for grafting these coordinates to the derivatives of the transition metals of the VIIIth group.

For example the so-called coordinate exchange method may be used, according to which the asymmetric bidentate coordinate may be substituted to the coordinate stabilizing the transition metal at its convenient oxidation degree.

For example, starting from the bridged rhodium complexes of the general formula Rh₂Cl₂(olefine)₄, the four olefines may be substituted with two asymmetric bidentate coordinates.

Starting from NiCl₂, 2L, the two monodentate ligands L may be substituted with a bidentate ligand of this invention.

Alternatively, the asymmetric bidentate coordinate may be directly added to a metal salt, for example NiCl$_2$ or RhCl$_3$.

The resulting catalytic compositions may be used in various asymmetric synthesis, for example for hydrogenating with hydrogen a disubstituted olefine, for example an acrylic amide, ester or acid or an α-ethylenic amine.

For example atropic acid or an ester thereof may be hydrogenated to a hydratropic derivative:

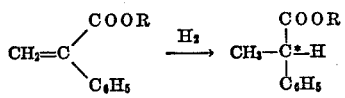

R being a hydrocarbon group.

Ene-amines may be also hydrogenated, as well as their derivatives, thus resulting in the asymmetric synthesis of amino-acids.

Thus, for example, the synthesis of optically active amino-acids may result from the following steps:

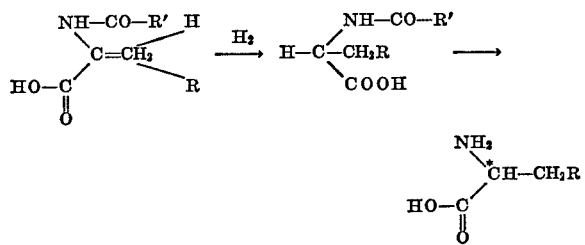

The following examples are illustrative of the possible applications of the coordinates of this patent application.

By way of example, these coordinates may be used in combination with rhodium catalysts in the asymmetric synthesis of hydratropic acid, various amino-acids precursors and amines.

EXAMPLE 5

This example relates to the hydrogenation of atropic acid. Atropic acid is used at a rate of 33 grams per liter of solvent (a mixture of benzene and ethanol in the ratio of 1:2 by volume).

The catalyst precursor is the complex Rh$_2$Cl$_2$(cyclooctene)$_4$ to which the diphosphine ⑨ of Example 2 and triethylamine are added.

The rhodium concentration is 5 mAt./liter, the (mol/at.) ratio of the diphosine of Example 2 to rhodium is 1.1 and the (mol/at.) ratio Et$_3$N/Rh is in the range from 1.2 to 3.

Room temperature and a hydrogen pressure of 1.1 atm. are used.

The optical yield of hydratropic acid is 64%. This yield has been calculated according to the value $[\alpha]_D = 100.5°$ (C$_6$H$_6$) for the optically pure product.

EXAMPLE 6

There is now used the diphosphine ⑨ of Example 2 for hydrogenating atropanilide.

The catalyst solution is prepared by adding under argon atmosphere 0.1 mM. of diphosphine to a solution either of 0.045 mM. of the complex Rh$_2$Cl$_2$ (cyclooctene)$_4$ or of 0.05 mM. of the complex Rh$_2$Cl$_2$(C$_2$H$_4$)$_4$ in 2 to 6 ml. of benzene. The resulting solution is stirred for 10 minutes to 1 hour and introduced into the hydrogenation reactor containing atropanilide dissolved in the solvent of Example 5.

The hydrogenation is carried out at room temperature and atmosphere pressure.

Under these conditions, atropanilide of the hereinafter given formula yields (R) hydratropanilide with an optical yield of 25% (the chemical yield is 80%) $[\alpha]_D = 127.5°$ (C$_6$H ) for the optically pure product.

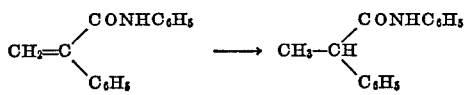

EXAMPLES 7 TO 11

The operating conditions and the diphosphine of Example 6 are used again; however the substrate and the results are as follows:

| Example Number | Substrate | Resulting compound | Optical yield, percent |
|---|---|---|---|
| 7 | CH$_2$=C(COOH)(NHCOCH$_3$) | (D) CH$_3$—CH(COOH)(NHCOCH$_3$) | 73 |
| 8 | 2-OH-phenyl-O-C(=CH)(COOH)(NHCOCH$_3$) | (D) 2-OH-phenyl-O-CH$_2$—CH(NHCOCH$_3$)(COOH) | 75 |
| 9 | methylenedioxyphenyl-C(=CH)(COOH)(NHCOCH$_3$) | (D) methylenedioxyphenyl-CH$_2$—CH(NHCOCH$_3$)(COOH) | 79 |
| 10 | phenyl-CH=C(COOH)(NHCOC$_6$H$_5$) | (D) C$_6$H$_5$—CH$_2$—CH(NHCOC$_6$H$_5$)(COOH) | 64 |
| 11 | phenyl-C(=CH)(COOCH$_3$)(NHCOCH$_3$) | (D) phenyl-CH$_2$—CH(NHCOCH$_3$)(COOCH$_3$) | 55 |

The optical yields are calculated according to the following values of the rotary powers of the optically pure products:

N-acetyl (D) alanine [α]_D= +66.50° (H₂O)
N-acetyl (D) tyrosine [α]_D= —48.3° (H₂O)
N-acetyl (D) 3,4-methylenedioxy.aPshyd +
N-acetyl (D) 3,4-methylenedioxy phenyl alanine [α]_D= —53.4° (EtOH)
N-benzoyl (D) phenylalanine [α]_D= —19.8 (c.=8.8; 0.4 N NaOH)
N-acetyl (D) phenyl alanine, methyl ester [α]= +21.4° (MeOH)

After hydrogenation, the solutions are treated in a manner which is adapted to the nature of the resulting products.

Thus, with respect to N-acetyl alanine and N-acetyl tyrosine, the hydrogenated solutions are evaporated to dryness. The residue is taken up in water. The insoluble catalyst system is separated by filtration on fritted glass or silica layer. The products isolated by evaporating the filtrate are obtained with a molar chemical yield higher than 95%.

With respect to N-acetyl 3,4-methylene dioxy phenyl alanine, N-benzoyl phenyl alanine and N-acetyl phenyl alanine, the treatment is the following: the hydrogenated solutions are evaporated to dryness and the residue is taken up with a diluted aqueous solution of sodium hydroxide.

The insoluble catalyst is filtrated off. The filtrate is acidified and extracted with ether. The amino-acid is obtained with a molecular chemical yield higher than 90%.

N-acetyl (D) phenyl alanine, methyl ester is separated from the catalyst by chromatography on plate or on silica column (elution with a mixture hexane/ethyl acetate).

EXAMPLE 12

Example 6 is repeated with the following reactants:

0.05 mM. of Rh₂Cl₂ (cyclooctene)₄ in benzene,
0.11 mM. of the diphosphine ⑨ of Example 2,
30 mM. of α-acetamino cinnamic acid previously dissolved in 10 ml. of absolute ethanol.

After 1 hour at 25° C. under a hydrogen pressure of 1 kg./cm.², the chemical yield of acetyl phenyl alanine amounts to 97%.

The optical yield is 72%. The latter is based on the value [α]_D=51.8° for the optically pure product.

EXAMPLE 13

The following scheme is used to obtain optically active N-acylated amines:

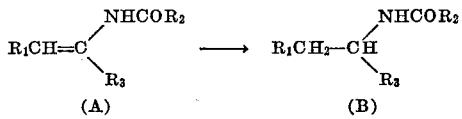

The hydrogenation conditions are the same as in Examples 7 to 11. The resulting products are separated from the catalyst by chromatography on plate or column.

Thus the hydrogenation of the ene-amide (A) (R₁=R₂=CH₃; R₃=C₆H₅) manufactured according to Suen, Horeau and Kagan (Bull. Soc. Chim. Fr. (1965) 1454) yields (L) N-acetyl α-phenyl propylamine (B) with a chemical yield of 90% and an optical purity of 78%.

The optical yield is deduced from the value for the pure (L) N-acetyl α-phenyl propylamine: [α]_D=137.5° (MeOH) (Il Farmaco, 1967, 22, p. 1037).

EXAMPLE 14

The diphosphine of Example 3 has been used in the hydrogenation of α-acetamido cinnamic acid under the conditions of Example 6. The optical yield to N-acetyl (D) phenyl alanine was 39%.

EXAMPLE 15

The diphosphine of Example 4 has been used under the conditions of Example 12 with α-acetamido cinnamic acid. The molar yield was 98% and the optical yield to acetyl (L) phenyl alanine was 71%.

The above examples may be repeated with other reactants or catalysts within the scope of this invention. For example, according to this invention, benzedrine may be manufactured by hydrogenation of one of its precursors of the formula C₆H₅—CH=C(CH₃)NHCOCH₃.

The hydrogenated product is thereafter hydrolyzed. Other amides, esters or acids may be hydrogenated, for example the derivatives of acrylic, crotonic or cinnamic acid substituted in α-position by any convenient group, for example alkyl, aryl, cycloalkyl, amino, carboxy, ester, nitro, cyano, ether or amide, starting materials for tyrosine, L-DOPA and related compounds.

In the same way, the rhodium complex may be substituted with other complexes, for example those formed between a group VIII metal salt and an olefine.

The ratio of the number of rhodium atoms to the number of diphosphine molecules is advantageously higher than 0.5, for example 0.6 to 2 and preferably 0.75 to 1.5.

The manufacture of the diphosphine and the hydrogenation may be carried out in a broad temperature range, for example from —50 to +50° C. or more, and a broad pressure range, and the invention is not limited to the particular values hereinbefore given in relation with the examples. For example, the pressure may range from 0.5 to 200 kg./cm.².

What we claim as our invention is:

1. A coordinate compound which has the formula

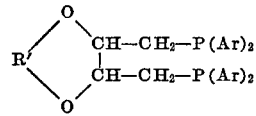

in which R' is alkylidene of 1-3 carbon atoms, or benzylidene; and Ar is phenyl, tolyl or xylyl.

2. A coordinate compound as defined by claim 1, and of the formula

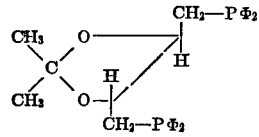

wherein Φ is phenyl or

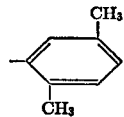

3. A coordinate compound is defined by claim 1, and of the formula

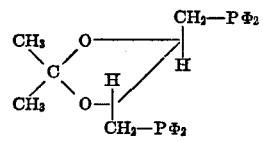

wherein Φ is

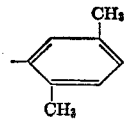

4. A coordinate compound as defined by claim 1, and of the formula
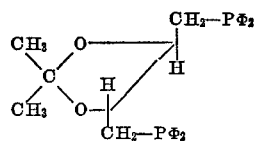
wherein Φ is phenyl.
No references cited.
NICHOLAS S. RIZZO, Primary Examiner
J. H. TURNIPSEED, Assistant Examiner
U.S. Cl. X.R.
252—428, 430, 437, 438; 260—340.2, 340.5, 440, 446, 471 A, 475.5 C, 476 R, 488 P, 488.5, 519, 534 C, 534 R, 561 P, 561 A, 558 A, 592, 593 R, 606.5 P